United States Patent [19]

Kaoru et al.

[11] Patent Number: 4,864,316
[45] Date of Patent: Sep. 5, 1989

[54] VEHICLE RECEIVING APPARATUS USING A WINDOW ANTENNA

[75] Inventors: Sakurai Kaoru; Murakami Harunori; Torii Toshio; Oka Hidetoshi, all of Osaka, Japan

[73] Assignee: Nippon Sheet Glass Co., Japan

[21] Appl. No.: 209,543

[22] Filed: Jun. 21, 1988

[30] Foreign Application Priority Data

Jun. 27, 1987 [JP] Japan ................. 62-98954
Jul. 4, 1987 [JP] Japan ................. 62-103110

[51] Int. Cl.⁴ .............................. H01Q 1/02
[52] U.S. Cl. ................... 343/704; 343/712; 343/713; 219/203
[58] Field of Search .......... 343/704, 711, 712, 713; 219/201, 203, 522; 455/277

[56] References Cited

U.S. PATENT DOCUMENTS

| 2,944,926 | 7/1960 | Gaiser | 343/704 |
| 2,954,454 | 9/1960 | Gaiser | 219/203 |
| 4,422,077 | 12/1983 | Kropielnicki | 343/713 |
| 4,703,328 | 10/1987 | Jones et al. | 343/704 |
| 4,725,710 | 2/1988 | Ramus et al. | 343/704 |

FOREIGN PATENT DOCUMENTS

| 655303 | 1/1963 | Canada | 219/210 |
| 730131 | 1/1943 | Fed. Rep. of Germany | 343/704 |
| 0044541 | 4/1977 | Japan | 343/713 |
| 0131606 | 6/1987 | Japan | 343/32 |

Primary Examiner—Rolf Hille
Assistant Examiner—Hoanganh Le
Attorney, Agent, or Firm—Jones, Day, Reavis & Pogue

[57] ABSTRACT

In a vehicle window glass antenna, linear electrodes are bonded to edges of a transparent conductive film deposited on substantially the entire surface of a glass window, and tuning conductors are arranged so as to tune antenna elements including these linear electrodes to a specific reception band, thereby increasing a reception gain without degrading the heat wave reflecting performance of the transparent conductive film. The tuning conductors are strip-shaped transparent conductive films separated by cut lines or linear conductors bonded to the linear electrodes.

3 Claims, 6 Drawing Sheets

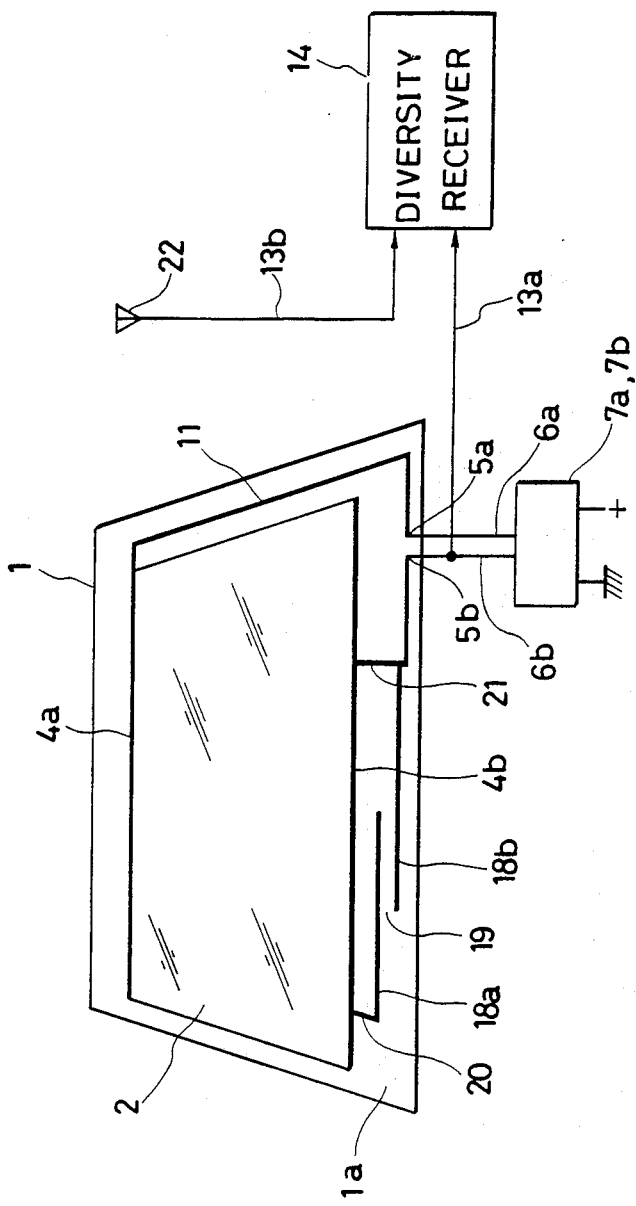

VEHICLE RECEIVING APPARATUS USING A WINDOW ANTENNA

BACKGROUND OF THE INVENTION

1. Field of the Invention:

The present invention relates to receiving apparatus of a vehicle and, more particularly, to a receiving apparatus using a conductor attached to a window glass as a diversity receiver antenna.

2. Description of the Prior Art:

It is known to deposit a transparent conductive film such as ITO and $SnO_2$ films for heat wave reflection on a window glass so as to enhance a low-temperature insulating effect in a vehicle. In addition, it is known to use this transparent conductive film as a heating conductor for defogging and as an antenna conductor in a rear window.

In a receiving apparatus using such a transparent conductive film as a heating conductor and an antenna conductor, tuning is difficult, and an excellent receiving function cannot be obtained in terms of a gain (sensitivity), directivity, a frequency characteristic, and the like. For this reason, it is proposed to form an antenna conductor pattern by limiting a heating area for defogging substantially to a central portion of the entire glass surface and printing and baking a silver paste on a blank area where no transparent conductive film is formed.

As is known, in an antenna obtained by printing/baking, its wiring pattern can be satisfactorily tuned to a specific broadcast wave band (AM, FM, or the like), and an excellent receiving performance can be obtained. However, since a portion having no transparent conductive film is formed on the surface of a glass window, a heat wave reflecting function is degraded. Furthermore, if a conductive pattern with a high line density is formed, visibility is degraded, and hence the field of vision is interfered.

SUMMARY OF THE INVENTION

The present invention has been made in consideration of the above-described problems, and has as its object to obtain an excellent receiving function without degrading the heat wave reflection function and the visibility.

A vehicle receiving apparatus according to the present invention comprises a transparent conductive film deposited on substantially the entire surface of a rear window glass of a vehicle except for a peripheral portion thereof and heated for defogging, a linear electrode bonded to an edge of the transparent conductive film along a substantially total width of the glass window, a tuning conductor for tuning an antenna element including the linear electrode to a specific receiving band, and a diversity receiver for selecting an excellent signal from reception signals of a plurality of antennas including the antenna element.

Waves introduced by a two-dimensional transparent conductive film 2c are collected by the linear electrode with a small loss. According to one aspect of the present invention, the tuning conductor is a strip-shaped transparent conductive film separated from a heating area by a cut line. Tuning can be performed by separating the transparent conductive film into the area to be heated and an area for receiving signals.

According to another aspect, the tuning conductor is a linear conductor formed on a non-film-coated portion of a glass edge to be parallel to the linear electrode. The linear electrode and conductor are coupled to each other at a plurality of tuning points.

The linear electrode may be arranged independently from a feeder electrode for heating the transparent conductive film. The feeder electrode may be used as a linear electrode for receiving waves.

A reception gain is increased without degrading visibility and a heat wave reflecting function by arranging linear electrodes and conductors along the edges of the window glass.

BRIEF DESCRIPTION OF THE DRAWINGS

FIG. 5 is a front view of a conductor pattern, which corresponds to that in FIG. 1, according to a third embodiment of the present invention.

DETAILED DESCRIPTION OF THE PREFERRED EMBODIMENTS

Figure 1:
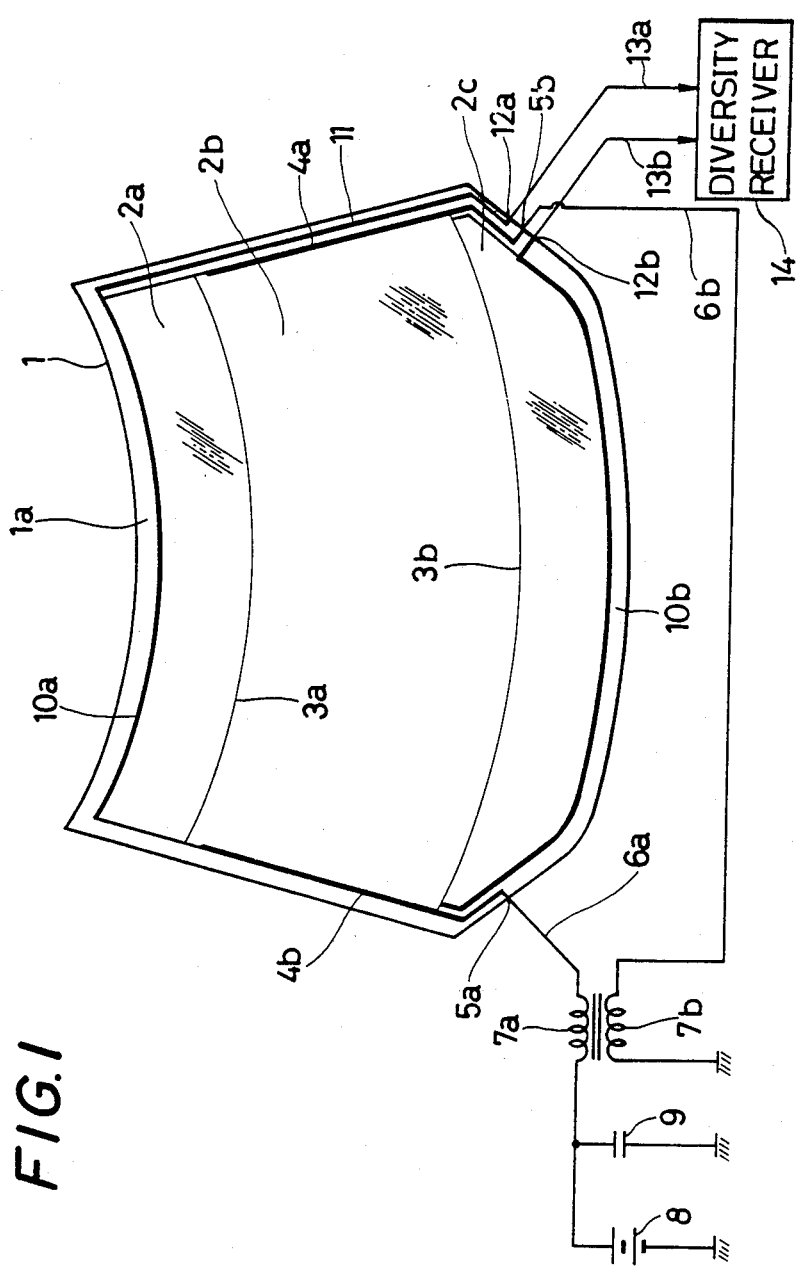
FIG. 1 is a front view showing a conductive pattern on a rear window glass of a vehicle according to a first embodiment of the present invention.

FIG. 1 is a plan view showing a rear window glass 1 of a vehicle, to which the present invention is applied. This rear window glass 1 is bent by heat and is mounted on the vehicle.

A transparent conductive film 2 is deposited on substantially the entire surface of the window glass 1 by sputtering, vapor deposition, or baking except for an edge 1a having a small width along each of the four sides of the window glass 1. The transparent conductive film 2 is divided into three areas, i.e., upper, middle, and lower areas by cut lines 3a and 3b, each having a width of about 0.5 mm. The cut lines 3a and 3b are substantially parallel to each other. A transparent conductive film 2b of the wide middle area occupying a substantially central portion of the window glass 1 is used as a heating conductor for defogging. Transparent conductive films 2a and 2c of the upper and lower areas are used as antenna conductors.

A silver paste or the like is printed and baked to form a pair of feeder electrodes 4a and 4b along both the side edges of the heating transparent conductor film 2b. One end of each of the feeder electrodes 4a and 4b is led to a corresponding one of both the lower side edges of the glass place 1, and is connected to a corresponding one of feeder lines 6a and 6b at a corresponding one of lead terminals 5a and 5b, thereby receiving a heating current.

The feeder lines 6a and 6b are respectively connected to a main power source battery 8 and ground through magnetically coupled choke coils 7a and 7b so that the heating current is flowed through the transparent conductive film 2b. The choke coils 7a and 7b exhibit a very high impedance in the frequency band of radio broadcast, and hence the power reception efficiency of the transparent conductive films 2a and 2c as the antenna conductors adjacent to the transparent conductive film 2b can be increased. Furthermore, a decoupling capacitor 9 is connected between a hot side power source line and a ground point to prevent noise generated at the power source line from mixing with reception signals.

A silver paste or the like is printed and baked to form linear electrodes 10a and 10b on the transparent conductive films 2a and 2c, serving as the antenna conductors, of the upper and lower areas along both the upper and lower edges. One end of the linear electrode 10a is led to a lead terminal 12a located at an end of the lower side of the glass through a feeder line 11 deposited along one (right) side of the window glass 1.

One end of the linear electrode 10b is led to a lead terminal 12b located close thereto at an end of the lower side of the glass. Input feeders 13a and 13b for a radio tuner or the like are connected to these end portions 12a and 12b so that reception wave currents are output.

The transparent conductive films 2a and 2c exhibit a relatively high sheet resistivity, whereas the linear electrodes 10a and 10b have a low sheet resistivity. Therefore, reception currents induced on the entire surface of the conductive films 2a and 2c can be collected with a small loss. In addition, the linear electrodes 10a and 10b themselves function as antenna elements. Two signals obtained from the input feeders 13a and 13b are supplied to a diversity receiver 14 for automatically selecting a superior one of the signals.

The feeder electrodes 4a and 4b, the linear electrodes 10a and 10b, the feeder line 11, and the lead terminals 5a, 5b, 12a, and 12b can be formed by printing and baking of a silver paste, as described above. After deposition of these conductors on the window glass 1, the transparent conductive films 2a, 2b, and 2c can be deposited by sputtering, vapor deposition, or spray coating, and baking of a transparent conductive material. Contrary to the above procedure, a printed wiring conductor may be printed and baked after the deposition of the transparent conductive films 2a to 2c. The cut lines 3a and 3b may be formed by, e.g., taping when the transparent conductive films are deposited on the glass surface, or may be formed by removing part of deposited conductive films by a laser beam, a cutter, or etching.

Substantially the entire surface of the window glass 1 shown in FIG. 1 is covered with the transparent conductive film 2b. The feeder electrodes 4a and 4b for heating, the linear electrodes 10a and 10b for receiving waves, the feeder line 11, and the like are arranged on the periphery of the glass window 1 where they are not conspicuous. Since the width of each of the cut lines 3a and 3b for dividing the transparent conductive film 2 is about 0.5 mm, it is difficult to detect them with the naked eye. For this reason, the window glass 1 appears to be a normal transparent glass plate without heating and antenna conductors. Therefore, an excellent field of rear view can be obtained without degrading the heat wave reflecting function.

Note that an opaque ceramic frame (masking) is formed along the periphery of the window glass so that the feeder electrodes 4a and 4b, the linear electrodes 10a and 10b, the feeder line 11, and the like are covered with this masking, and cannot be seen at all from the outside.

Figure 2:
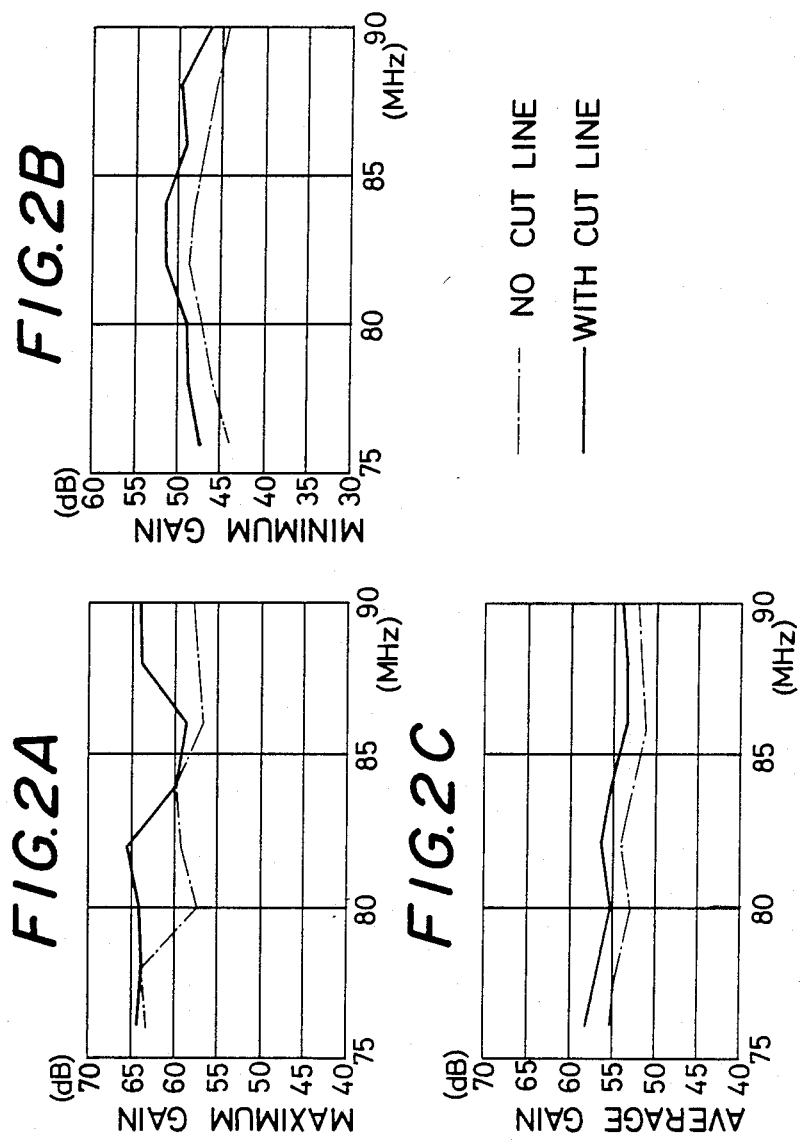
FIGS. 2A to 2C are graphs of frequency-gain curves respectively showing the maximum, minimum, and average gains of the antenna in FIG. 1.

The reception performance can be greatly improved by dividing the film 2b into the area to be heated and the antenna area using the cut lines 3a and 3b. FIGS. 2A to 2C are graphs showing reception gains in the FM band (75 to 90 MHz) so as to compare the cases wherein the cut lines 3a and 3b are formed and not formed in FIG. 1. FIGS. 2A, 2B, and 2C respectively show the maximum, minimum, and average gains obtained in diversity reception using two reception signals. As is apparent from these graphs, the characteristics (solid curves) with the cut lines 3a and 3b are greatly improved compared with the characteristics (broken curves) without the cut lines. It is considered that the transparent conductive films 2a and 2c constituting the antenna are electrically and spatially separated from each other by forming the cut lines 3a and 3b so that complementary reception can be performed by mixing in space.

Figure 3:
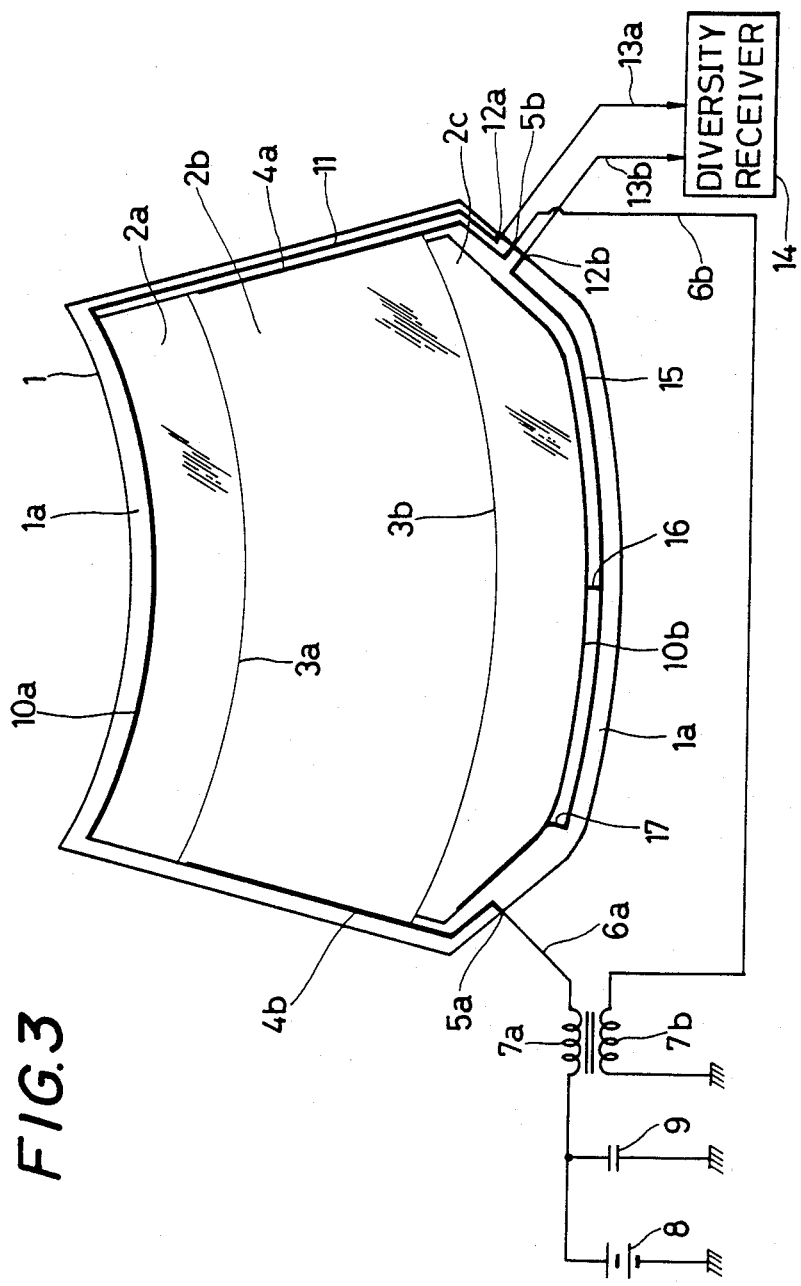
FIG. 3 is a front view of a conductive pattern, which corresponds to that in FIG. 1, according to a second embodiment of the present invention.

FIG. 3 shows a second embodiment, and the same reference numerals as in FIG. 1 denote the same parts in FIG. 3.

In this embodiment, a linear conductor 15 is formed on a non-film-coated glass edge portion 1a along a lower linear electrode 10b. The linear conductor 15 is separated from the linear electrode 10b by about 9 mm, substantially parallel thereto, and is continuous with a lead terminal 12b of the lower side of the glass. The linear conductor and electrode 15 and 10b are coupled to each other at coupling conductors 16 and 17. The two points where the coupling conductors 16 and 17 are located correspond to tuning points. The coupling conductor 16 is located at substantially the center, and the coupling conductor 17 is located at the distal end of the linear conductor 15 at a position of about 45 mm from the glass center in this embodiment. By properly setting the number and positions of these coupling conductors 16 and 17, reception signals collected at each point of the linear electrode 10b can be mixed on the glass surface in a matched state to the linear conductor 15, and a mixed signal can be output at the lead terminal 12b.

Since the transparent conductive film 12c is a surface conductor and has a relatively high sheet resistivity, signals guided to each portion of the film 12c are efficiently collected by a nearest portion of the linear electrode 10b with different phase and magnitude. Therefore, a plurality of points are selected on the linear electrode 10b, and signals are mixed in the linear conductor 15 formed on a glass surface without the conductive film 12c through the coupling conductors 16 and 17, and the like at the respective points, thereby improving the gain of a reception signal.

Input feeders 13a and 13b for a radio tuner or the like are connected to the lead terminals 12a and 12b so that reception wave currents are output. Two reception signals obtained from the input feeders 13a and 13b are supplied to a diversity receiver 14 for automatically selecting a superior one of the signals.

Figure 4B:
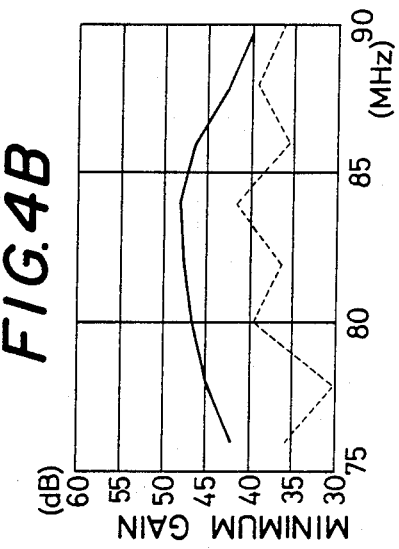
FIGS. 4A to 4C are graphs of frequency-gain curves respectively showing the characteristics of an antenna in FIG. 3 in the same manner as in FIGS. 2A to 2C.
Figure 4A:
Figure 4C:
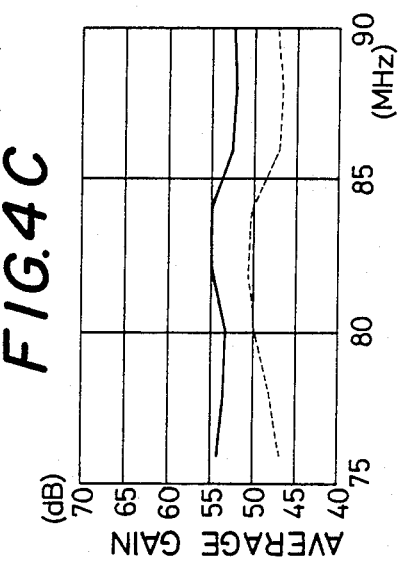
Figure 6A:
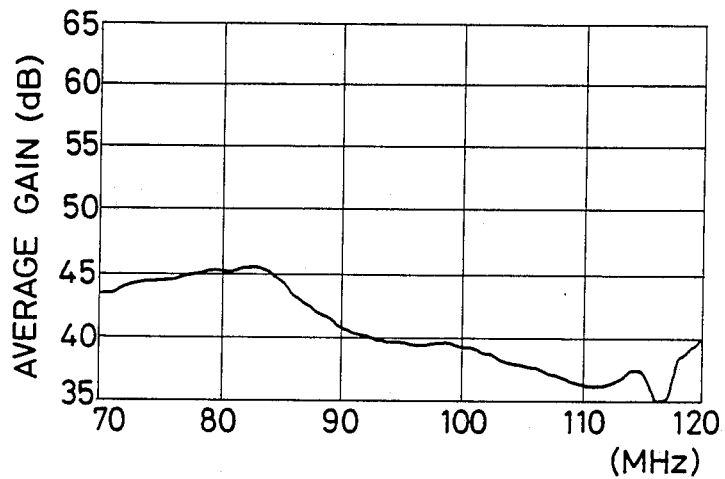
FIGS. 6A and 6B are graphs respectively showing frequency-gain curves showing the average gain of an antenna in FIG. 5.
Figure 6B:
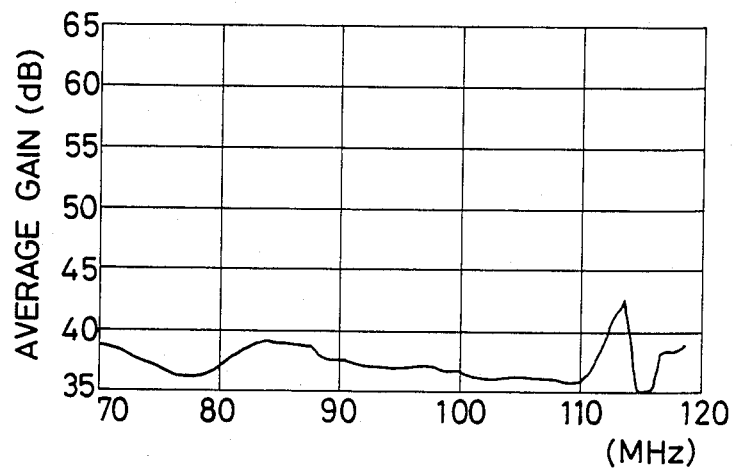

FIGS. 4A to 4C are graphs showing reception gains in the FM band (75 to 90 MHz) so as to compare the cases wherein the linear electrode and conductor 10b and 15 are coupled to each other using only the coupling conductor 17 to perform one-point wave collection, and using the coupling conductor 16 located at the center in addition to the coupling conductor 17 to perform two-point wave collection. FIGS. 4A, 4B, and 4C respectively show the maximum, minimum, and average gains obtained in diversity reception using two reception signals. As is apparent from these graphs, the characteristics (solid curves) in the two-point wave collection are greatly improved compared as the characteristics (broken curves) in the one-point wave collection.

In the arrangements shown in FIGS. 1 and 3, other cut lines (incomplete cut lines, which do not completely cross the films in the horizontal or the vertical direction) may be formed in the transparent conductive films 2a and 2c to adjust the lengths of the conductors from the wave collecting points, thereby tuning the resultant pattern to a specific broadcast band.

FIG. 5 shows a third embodiment, wherein feeder electrodes 4a and 4b for supplying heating currents are formed along the upper and lower edges of the transparent conductive film 2. One end of the electrode 4a is led to a lead terminal 5a located at the lower side of a glass window 1 through a feeder conductor 11. The electrode 4b is led from a point of ¼ the total length thereof to a lead terminal 5b through an L-shaped feeder conductor 21 as with the other embodiments, heating currents are supplied to the respective lead terminals 5a and 5b through choke coils 7a and 7b and feeder lines 6a and 6b.

The lower feeder electrode 4b and the transparent conductive film 2 are used also as antenna elements. A reception signal is guided to the lead terminal 5b through the feeder conductor 21, and is supplied to a diversity receiver 14 through an input feeder 13a.

In order to tune the antenna constituted by the feeder electrode 4b and the transparent conductive film 2 to a specific reception band, a complementary conductor consisting of linear conductors 18a and 18b parallel to the electrode 4b is formed on a glass edge 1a without the transparent conductive film 2. One end of the linear conductor 18a is coupled to a tuning point selectively set on the feeder electrode 4b through a coupling conductor 20. One end of the linear conductor 18b is connected to a tuning point selectively set on the feeder electrode 4b through the feeder conductor 21.

The linear conductors 18a and 18b are arranged to be adjacent to each other at their end portions through a gap 18, and are RF-coupled to each other. By adding these linear conductors 18a and 18b, and coupling them to the feeder electrode 4b at points allowing matching therewith, the gain of reception signals can be increased.

In this embodiment, a rear pole antenna 22 mounted on a rear portion of the vehicle is used as one of the antennas of the diversity receiver. A reception signal received by this rear pole antenna 22 is supplied to the diversity receiver 14 through an input feeder 13b. Reception signals from the window glass antenna and the rear pole antenna 22 are respectively supplied from the input feeders 13a and 13b to the diversity receiver 14, thereby selecting a superior one of the signals.

FIGS. 5A and 5B are graphs showing average reception gains in the FM band (70 to 120 MHz) in the cases wherein the linear conductors 18a and 18b are added, and not added. Both of the average gains are obtained in diversity reception. As is apparent from these graphs, a gain can be greatly increased by adding the linear conductors 18a and 18b.

Note that in FIG. 5, the lengths of the linear conductors 18a and 18b are respectively set to by 700 mm and 800 mm, and the distances from these conductors 18a and 18b to the linear conductor 4b are respectively set to be 15 mm and 30 mm. In addition, the linear conductors 18a and 18b are connected to the linear electrode 4b at positions 175 mm apart from both their ends.

As has been described above, linear electrodes are bonded to a transparent conductive film deposited on substantially the entire surface of a window glass of a vehicle, and tuning conductors are arranged so as to tune antenna elements including these linear electrodes to a specific reception band. These tuning conductors are strip-shaped transparent conductive films separated from a heating area by cut lines, or linear conductors formed on edges of the glass window. By utilizing these tuning conductors, a reception gain can be improved without degrading the heat wave reflecting function of the transparent conductive film and the visibility of the entire surface of the window glass.

What is claimed is:

1. A vehicle receiving apparatus comprising:
   a transparent conductor film deposited on substantially an entire surface of a rear window glass of a vehicle except for a peripheral portion, the transparent conductor film heating the rear window glass to defog it when current is passed through the film;
   a pair of linear electrodes bonded to upper and lower edges of said transparent film so as to extend horizontally along said window glass;
   a pair of strip-shaped antenna areas formed by dividing said transparent conductive film with two non-film-coated cut lines extending parallel to said linear electrodes and respectively connected to said linear electrodes, for tuning a pair of antenna elements including said linear electrodes to a frequency band in the range of 75 MHZ to 120 MHZ;
   a heating area constituted by a transparent conductive film between said strip-shaped antenna areas and connected to a pair of feeder electrodes bonded to both sides of the heating area for supplying heating currents; and
   a diversity receiver for selecting a signal that is greater in amplitude from among signals supplied from said pair of antenna elements.

2. An apparatus according to claim 1, wherein said apparatus comprises a choke coil connected between said feeder electrode and a power source.

3. An apparatus according to claim 1, wherein said apparatus comprises a linear conductor formed on a non-film-coated peripheral portion adjacent to said linear electrode, said linear conductor extends from a lead terminal for a reception signal to be parallel to said linear electrode and is coupled to said electrode at a plurality of selected tuning points.

* * * * *